United States Patent [19]

Okazaki

[11] Patent Number: 4,544,948
[45] Date of Patent: Oct. 1, 1985

[54] DIAGNOSTIC X-RAY APPARATUS

[75] Inventor: Kiyoshi Okazaki, Otawara, Japan

[73] Assignee: Tokyo Shibaura Denki Kabushiki Kaisha, Japan

[21] Appl. No.: 502,947

[22] Filed: Jun. 10, 1983

[30] Foreign Application Priority Data

Jun. 11, 1982 [JP] Japan .................. 57-99138

[51] Int. Cl.⁴ .............................. H04N 5/32
[52] U.S. Cl. .................... 358/111; 378/99; 364/414
[58] Field of Search .......... 358/111; 378/99; 128/653, 654, 655; 364/414

[56] References Cited

U.S. PATENT DOCUMENTS

| | | | |
|---|---|---|---|
| 4,178,510 | 12/1979 | Wagner | 364/414 |
| 4,204,225 | 5/1980 | Mistretta | 358/111 |
| 4,204,226 | 5/1980 | Mistretta | 358/111 |
| 4,272,820 | 6/1981 | Lux | 364/414 |
| 4,444,196 | 4/1984 | Stein | 358/111 X |
| 4,449,195 | 5/1984 | Andrews et al. | 358/111 |
| 4,463,375 | 7/1984 | Macorski | 378/99 |
| 4,504,908 | 3/1985 | Riederer et al. | 358/111 X |

OTHER PUBLICATIONS

"Latest Diagnostic System for Circulatory Organs", Nakashika et al., Toshiba Review, Int. Ed., Jul.-Aug. 69, No. 43, pp. 24-29.

"Clinical Experiences of Digital Subtraction Angiography using Digiformer II—A Prelim. Report—Takamiya et al., Toshiba Med. Review, Jan. 82, vol. 7, pp. 45-52.

Primary Examiner—Howard W. Britton
Assistant Examiner—Victor R. Kostak
Attorney, Agent, or Firm—Finnegan, Henderson, Farabow, Garrett & Dunner

[57] ABSTRACT

A diagnostic X-ray apparatus emitting pulsed X-ray radiation and including a processor for performing digital X-ray subtraction imaging which includes digitization of the video signals from an image intensifier-TV chain, digital subtraction and reconversion of the resultant digital difference video signals to analog signals, wherein the subtraction is performed for two successive difference images with multiplying each image by the respective weighting factor in a predetermined image sequence. The resulting difference image is compared with a standard and reduced to at least the standard before display.

4 Claims, 3 Drawing Figures

DIAGNOSTIC X-RAY APPARATUS

BACKGROUND OF THE INVENTION

This invention relates to an improvement in a diagnostic X-ray apparatus utilizing a digital X-ray subtraction imaging technique.

The digital X-ray subtraction imaging technique using an imaging intensifier-TV chain was developed and first described by Mistretta et al. For example, U.S. Pat. Nos. 4,204,225 and 4,204,226 issued to Charles A. Mistretta disclose real-time digital X-ray subtraction imaging methods and apparatus which are used in the so-called digital radiography or digital fluoroscopy technology.

These digital X-ray subtraction imaging apparatus include an image intensifier, a TV camera whose output is converted into digital format, and an image processor incorporating two digital memories. As disclosed in U.S. Pat. No. 4,204,225, in carrying out the mask mode of this technology a first memory is preferably employed to integrate and store digital mask video signals by digitization of video signals from an image intensifier-TV chain during an initial mask time interval utilizing a relatively large number of television fields. A second memory system integrates ongoing digital video signals and provides an output of these integrated video signals from which the mask video signals from the first memory system are subtracted. The resulting digital difference video signals are supplied to a digital-to-analog converter which provides corresponding analog difference video signals for display by a display device. Alternatively, the analog signals may be fed to a multiformat camera for making a selected number of radiographic exposures on a single film.

In the time interval difference mode disclosed in U.S. Pat. No. 4,204,226, a series of difference images is produced by integrating digital video signals over a series of successive time intervals, performing a series of subtractions between the sets of successive integrated video signals stored in the memories to produce a series of digital difference video signals, and converting such digital difference video signals into visibly displayed difference images representing changes in the X-ray image during the successive time intervals.

One advantage of digital radiography apparatus is its capability to perform angiography by means of intravenous injections instead of by intra-arterial catheter techniques with their higher risks. Still another advantage of digital radiography apparatus is its capability to provide improved low contrast detectability, namely, to amplify subtle amounts of contrast media in arteries better than film methods can. Another advantage of digital radiography apparatus employing pulsed X-rays is that significant loss of spatial resolution due to physiological motion can be prevented because the short radiation pulse for each image results in less loss of detail during fluoroscopy of moving objects.

In these digital radiography apparatus, the digital X-ray subtraction imaging technique is used to remove or at least reduce potentially confusing effects of uninteresting overlying and underlying objects and thereby to enhance the detectability of the structures of interest. In this process images are first produced without and then with contrast media present and unwanted images are eliminated since all structures common to both images are cancelled by subtracting the first image from the second. However, some unsubtracted images due to residual contrast media frequently accumulating in uninteresting and unwanted vascular areas, as to the analysis, appear in the result images because the subtraction leaves changes in the contrast medium distribution arising with time differences. These unsubtracted images reduce image quality and obscure the detectability of the structures of interest.

SUMMARY OF THE INVENTION

It is therefore the primary object of the present invention to overcome the above defect in prior art digital radiography apparatus using an imaging intensifier-TV chain, and to provide a diagnostic X-ray apparatus which removes from the result images any unsubtracted images arising due to residual contrast media during the digital X-ray subtraction.

It is another object of the invention to provide diagnostic X-ray apparatus for decreasing the confusing effects of tissues overlying and underlying the object under analysis due, in particular, to residual contrast media accumulating during time differences in vascular areas not significant in the analysis.

It is yet another object of the invention to improve diagnostic X-ray apparatus using the digital X-ray subtraction technique, in which weighted subtraction is done repeatedly.

Briefly stated, in accordance with the aforementioned objects, the present invention provides diagnostic X-ray apparatus for removing or significantly decreasing unsubtracted images due to accumulated residual contrast media.

This result is accomplished in diagnostic X-ray apparatus for producing video signals representing difference images from X-ray images of the same objective by means of comparing the value of the video signals of a difference image with a predetermined standard and means for reducing the value at least to the predetermined standard, if the value exceeds the standard, whereby any signal values representing unwanted background images developed as the result of time differential between relevant X-ray images are removed or substantially reduced.

BRIEF DESCRIPTION OF THE DRAWINGS

The invention will become more clearly apparent when the following description is read in conjunction with the accompanying drawings in which.

DESCRIPTION OF A PREFERRED EMBODIMENT

Figure 1:
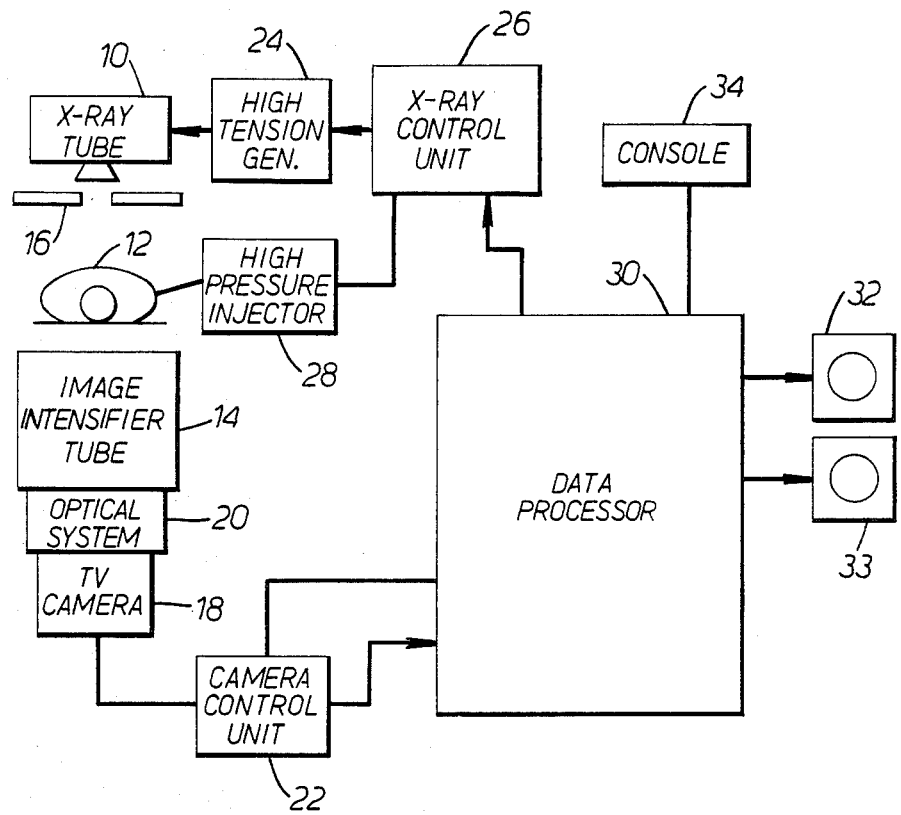
FIG. 1 is a schematic block circuit diagram of an arrangement for diagnostic X-ray apparatus using digital X-ray subtraction imaging technique according to one embodiment of the present invention.

FIG. 1 is a block diagram of the improved diagnostic X-ray apparatus using a digital X-ray subtraction imaging technique in accordance with the present invention.

An X-ray tube 10 having a conventional filament and anode produces X-rays which impinge on a patient 12, thus casting a shadow image of the patient on an input of an image intensifier tube 14. A servo-controlled collimator 16 along with a collimator servo system (not shown) disposed between the X-ray tube 10 and the patient is utilized to control the size of the X-ray beam emitted from the X-ray tube 10. The intensifier 14 intensifies the X-ray image and produces a corresponding optical image on the output screen of the intensifier 14.

This image is scanned by a TV camera 18, via a known optical system 20 including an object lens, a field lens, and an auto iris (all not shown), for adjusting the quantity of light from the intensifier 14, under the control of a TV camera control unit 22 to produce corresponding video signals on an output of the unit 22. A high tension generator 24 serves to provide high voltage to energize the X-ray tube 10 under control of an X-ray control unit 26.

The X-ray control unit 26 may energize the X-ray tube 10 to radiate pulsed X-rays either by a method using a thyristor switching system or a method using a tetrode switching system. These methods have previously been described by Nakashima et al. in *Toshiba Review* International Edition, No. 43, Jul-Aug, 1969, pp. 24-29.

A contrast medium is preferably injected into the right basilic vein of the patient 12 using a high-pressure injector 28 at a flow rate of 12 cc/s under control of the X-ray control unit 26. A data processor 30 for carrying out digitization of the analog video signals from TV camera 18, digital subtraction, contour enhancement and reconversion to analog signals, is connected to the TV camera control unit 22. The X-ray control unit 26 is also connected to the data processor 30 for receiving television synchronizing pulses to synchronize the operation of the X-ray control unit 26 with the television fields. The data processor 30 supplies the resulting analog difference video signals for display by the television display devices 32, 33.

The data processor 30 performs such manipulations in response to command signals initiated from an operator console 14.

Figure 2:
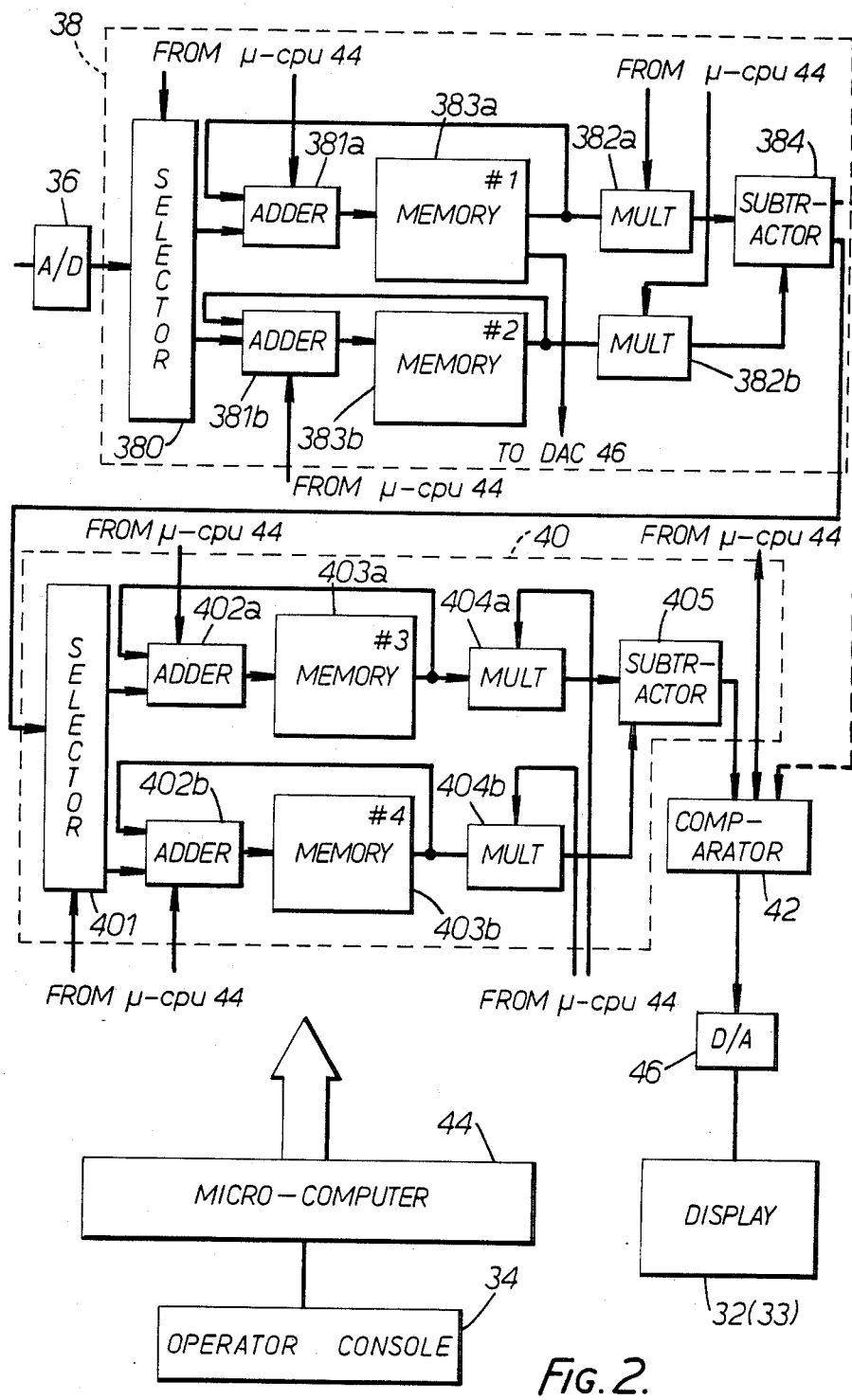
FIG. 2 is a functional block diagram of one form of the data processor utilized in the apparatus of FIG. 1.

Attention is now directed to FIG. 2 which shows a detail diagram as an example of the data processor 30.

Basically, the data processor 30 comprises an analog-to-digital (ADI) interface circuit 36 (to be discussed in detail below), a pair of weighted digital subtraction systems 38 and 40, a digital comparator circuit 42 for comparing the amplitude of the output of the weighted digital subtraction systems 38 and 40, a digital comparator circuit 42 for comparing the amplitude of the output of the weighted digital subtraction systems with a predetermined standard which is generated from a micro-computer 44, and a digital-to-analog (DAI) interface circuit 46 for converting the digital difference video signals into the analog difference video signals. The micro-computer can be programmed to provide all of the control, timing and synchronizing pulses and signals for the entire system including the X-ray control unit 26, and perform the weighted digital subtraction operations in the predetermined sequence, if desired.

The ADI, as known, includes a separator for separating field synchronizing pulses at rate of 1/60 sec. per field from composite video signals provided via the TV camera control unit 22, a sample circuit for sampling the analog video signals in response to command signals initiated by the micro-computer 44, a timing pulse generator for providing a timing pulse at the rate of 1/30 sec. (33 msec) in accordance with one television frame consisting of two individual fields based on the output from the above-mentioned separator, and an analog-to-digital (ADC) converter for converting the analog video signals into corresponding digital video signals. The digitized video signals are supplied to the first weighted digital subtraction system 38 for integrating, storing and performing weighted subtraction on the digital video signals, to provide the subtracted digital signals.

The first weighted digital subtraction system 38 includes a selector switch 380 for supplying the digital video signals of two television fields to individual ones of two digital adders 381a and 381b, under control of micro-computer 44, and then to respective ones of two digital memories 383a and 383b, each of which is capable of storing the digital signals for at least one complete television field. A pair of multipliers 382a and 382b multiply the respective input digital video signals by a weighting factor generated from the micro-computer 44. The products of multipliers 382a and 382b are received in subtractor 384 to provide the results of the first weighted subtraction.

In the preferred embodiment, the digital video signals in the memory 383a are fed back to the memory and retained there for purposes explained hereinafter when the integrated video signals in the memory are fed to the multiplier 382a.

The second weighted digital subtraction system 40 includes a selector switch 401 which selects either a digital adder 402a or a digital adder 402b, and transfers the output digital signals from the subtracter 384 of the first weighted digital subtraction system 38 to the digital adder selected. Two digital memories 403a, 403b, each having the capacity of storing the digital signals for at least one complete television field, are respectively connected to the outputs of digital adders 402a, 402b. Two multipliers 404a, 404b multiply the digital video signals from the memories 403a and 403b, respectively, by a weighting factor generated from the micro-computer 44. The products of multipliers 404a and 404b are sent to subtracter 405 in which these products are subtracted and the difference transmitted to the digital comparator circuit 42.

The digital adders 381a, 381b, 402a and 402b make possible the integration of overlapping and successive pictures to complete the television field desired by adding and integrating the video signals of successive camera shots for storage in the memories 383a, 383b, 403a and 403b, as relevant.

In the apparatus, as so far described, a first X-ray image, or an integrated series of X-ray images, may be stored in memory 383a and a second X-ray image, or integrated series of X-ray images, may be stored in the other memory 383b, multiplied by a weight factor and then the first stored image subtracted from the second to remove material in the second shown in the first.

The resulting difference image is then stored in memory 403a or 403b. A third image can then be stored in memory 383b originally occupied by the second image and the first image subtracted, resulting in a second difference image which is stored in the unoccupied memory 403a, 403b. The first difference image can then be subtracted from the second difference image to produce a third difference image.

Generally, the digital subtraction imaging includes the so-called mask mode method, in which a series of difference images is produced by developing a preinjection mask image, prior to the injection of the contrast medium, and electronically subtracting the mask image from the integrated series of post-injection images. This mask subtraction mode results in the removal of effects due to soft tissue and bone or air-filled structures, so that the image elements due to the contrast medium are more clearly visible in the subtracted images. An alternative method that may be used is the time interval difference method in which each set of the integrated digital images is used as a mask for the following integrated image. The time interval difference method is particularly well adapted for visualizing the progress of a contrast medium injected into a peripheral portion of the cardiovascular system.

During each television field of the mask time interval, new digital video signals are added by the adder 381a to the recirculating, previously stored digital video signals and the combined or integrated video signals are again fed into the digital memory 383a. After the end of the mask time interval, new digital video signals are no longer added, but are provided to the adder 381b and then to the other memory 383b, the switching of the selector 380 being in response to command signals initiated from micro-computer 44.

Varying weighting factors may be fed from a read only memory in micro-computer 44 to multipliers 382a, 382b and 404a, 404b. The weighting factors are stored digitally in the read only memory as a sequence of increasing strength. The factors may be applied to the multipliers as required to increase the intensity of the video signals issuing from the memories. On the other hand, the weighting factors may be used in increasing strength, as necessary, to reduce the intensity of the video signals issuing from the comparator 42, as described hereinafter.

The subtracted digital video signals from subtracter circuit 405 are provided to one input of digital comparator circuit 42. The other input of digital comparator 42 is provided with a predetermined standard from microcomputer 44. When the subtracted digital video signal exceeds the predetermined standard, an order is given to the read only memory micro-computer 44 to apply a weighting factor to the subtracted digital video signal to reduce this signal. The weighting factor from the read only memory is increased under orders of the microcomputer 44 until the subtracted digital video signal is no greater than the predetermined standard.

Then a release signal is provided to the read only memory, and concurrently, the subtracted digital video signal from subtracter circuit 405 is provided through digital comparator 42 to digital-to-analog converter 46. The analog difference video signals corresponding to each subtracted digital video signal which is converted by the DAC 46 are amplied by an amplifier (not shown), and supplied to one of the television display devices, or monitors, 32, 33. Thus, the television monitor produces a series of visible difference images, representing the difference between the preinjection mask image and post-injection image. The other television monitor 33, 32, may display the mask image from the first memory 383a continuously for reference via digital-to-analog (DAC) converter 46.

If a third X-ray image is not required for the analysis, the difference image from subtracter 384 may be sent directly to the comparator 42, as shown by the broken line in FIG. 2. This difference image will then be reduced within the standard, as described above, and processed to the display.

Figure 3:
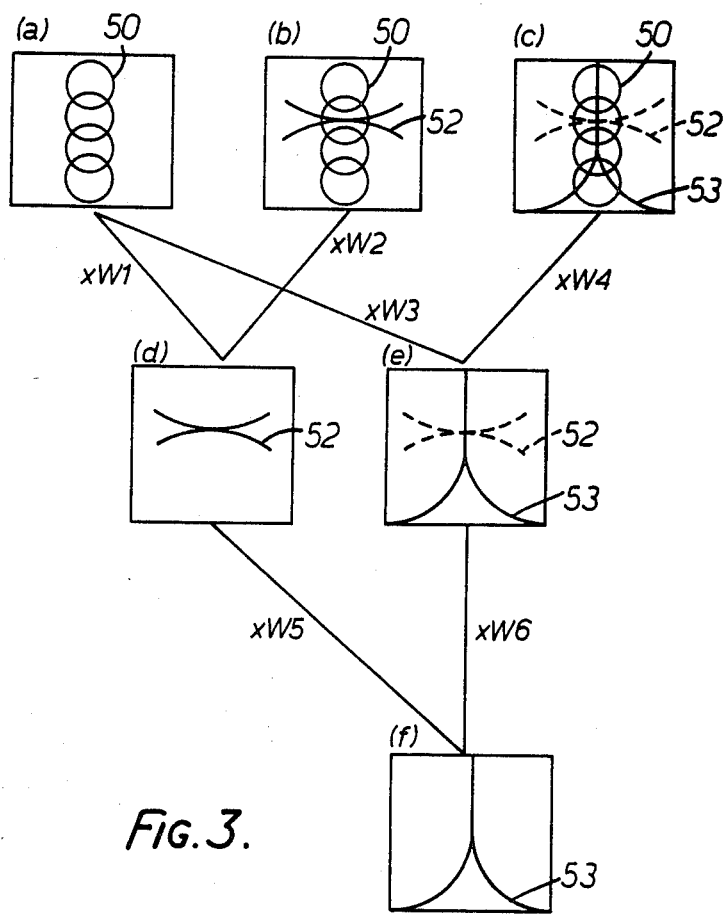
FIG. 3 is a schematic representation of serial imaging in accordance with weighted subtraction technique by the present invention.

Reference is now made to FIG. 3 which illustrates a typical visual presentation which might be presented in accordance with weighted digital subtraction imaging.

In the mask mode, the X-ray control unit 26 provides the X-ray exposure pulses synchronized with television frames to the high-tension generator 24 in response to the timing signal, as an X-ray exposure trigger signal, generated by the micro-computer 44. These X-ray exposure pulses energize the high-tension generator 24 to produce pulsed X-rays instantly on command at selected programmed time intervals corresponding to 8 television frames.

The high tension generator 24 includes a switching device which is turned on and off by 100 msec pulses from the X-ray control unit 26. For each X-ray exposure, the TV camera 18 will produce three complete difference images and transmit them to the data processor 30. The analog video signals from the TV camera control unit 22 are gated, sampled and held on command from the micro-computer 44 in the analog-to-digital interface circuit 36 during predetermined mask time intervals defined from operator console 34. The successive television frames produced by the pulsed X-ray exposures are introduced to the ADI 36, and the ADI supplies corresponding digital video signals via the selector switch 380 to the first digital weighted subtraction system 38 where image shown in FIG. 3 (a), serving as a mask for the subtraction, is made before the contrast medium injection.

In FIG. 3 (a) a chest X-ray image, as an example, obtained in such manner shows the bone structure indicated by 50. The integrated mask image is stored in the first memory 383a.

Thereafter, an X-ray contrast medium is injected into a vein in the arms or legs of the patient 12 using the injector 28 with a timing such that the contrast medium appears in the vascular area of interest in the subsequent X-ray image. The microcomputer 44 causes the second memory 383b incorporating the results of adder 381b to integrate and store the new incoming digital video signals over time intervals on the order of four television frames. The integrated digital video signals from the first and second memories 383a, 383b are supplied to multipliers 382a, 382b in which the integrated digital video signals are multiplied by a weighting factor W1 (=1), W2 (=1) being in the form of a digital signal. Thus, the first subtraction image is produced by subtracting the first integrated image from the second, as represented by FIG. 3 (b), which shows the common bone 50 and the first vascular area of interest indicated by 52 underlying the bone 50.

Alternately, the mask image in the first memory 383a is subtracted by the subtracter circuit 384 from the integrated subsequent video signals from the second memory 383b.

The digital difference video signals from the output of the subtracter circuit 384 are supplied to the selector switch 401 of the second weighted subtraction system 40 and to the third memory 403a through the digital adder 402a. The difference image in which bone and soft tissue have been cancelled, as stored in the third memory 403a, is represented by FIG. 3 (d).

During the next time interval, the incoming digital video signals for the second subtraction image are provided to the second memory 383b through digital adder 381b, as shown in FIG. 3 (c). FIG. 3 (c) shows that the contrast medium exists in the second vascular area of interest indicated by 53 with a high density, and the residual contrast media is left in the first vascular area 52 with a low density. The micro-computer 44 provides control signals which cause the subtracter circuit 384 to subtract the mask image from the first memory 383a multiplied by a weighting factor W3 (=1) in the multiplier 382a, from the current subtraction image from the second memory 383b multiplied by a weighting factor W4 (=1) in the multiplier 382b.

Thus, a second difference image, as represented by FIG. 3 (e), is produced, and stored in the fourth memory 403b via selector switch 401 and digital adder 402b. The second difference image contains non-zero signals representing residue from the first vascular area 52 which is an obstacle to studying the second vascular area 53 of interest in the second difference image shown in FIG. 3(e).

Next, the micro-computer 44 causes the subtracter circuit 405 of the second weighted subtraction system 40 to subtract the first difference image represented by FIG. 3 (d) from the third memory 403a from the second difference image represented by FIG. 3 (e) derived from the fourth memory 403b. The digital video signals from the third memory 403a are supplied to the multiplier 404a, which is provided for the purpose of multiplying a weighting factor W5, for example, being selected as 1. The output of multiplier 404a is supplied to one input of subtracter circuit 405. Also, the digital video signals of the second difference image from the fourth memory 403b are supplied to the multiplier 404b, and multiplied by a weighting factor W6 in proportion to the ratio between the digital video signals at the same position in the two difference images.

These weighting factors W5 and W6 are generated from the read only memory of micro-computer 44, which vary continuously under control of micro-computer 44.

The outputs of multipliers 404a and 404b are provided to the subtracter circuit 405, in which the digital video signals weighted with factor W5 corresponding to the first difference image are subtracted from the digital video signals weighted with factor W6 corresponding the second difference image. The results of this weighted subtraction operation are transmitted to digital comparator circuit 42.

In digital comparator circuit 42 that portion of, the result signal including a residue from first vascular area 52 is compared to the predetermined standard generated from microcomputer 44, to establish a weighting function W5 which will result in cancellation of the unsubtracted image of first vascular area 52. The resulting subtracted digital video signals from subtracter circuit 405 are provided to DAC 46.

The analog difference video signals corresponding to each subtracted digital video signal which is converted by the DAC 46 are amplified by an amplifier (not shown), and supplied to one of the television display devices or monitors 32, 33. Thus, full subtracted and enhanced images, represented by FIG. 3 (f), without an interfering background are displayed on a monitor.

If desired, the analog difference video signals from the output of the DAC 46 may also be supplied to an external storage medium (not shown), for example, a video disc recorder, so that the video signals can be recorded and played back repeatedly through the monitor.

It is also possible to change any of the weighting factors W1-W4 responsive of the condition of the X-ray exposure under control of micro-computer 44.

While the present invention has been described with reference to particular embodiments thereof, it will be understood by those skilled in the art that numerous modifications can be made without actually departing from the scope of the invention. Accordingly, all modifications and equivalents may be resorted to which fall within the scope of the invention as claimed.

What is claimed is:

1. A diagnostic X-ray apparatus comprising:
   means for producing first digital difference video signals of an object under observation when contrast medium is in a first state of distribution within that object;
   means for producing second digital difference video signals of said object when said contrast medium is in a second state of distribution within that object;
   means for weighting said first and second difference signals with first and second weighting factors, respectively, to produce first and second weighted digital difference video signals;
   means for subtracting said first weighted difference video signals from said second weighted difference signals to produce third digital video signals of said object;
   means for comparing said third video digital signals to a predetermined value; and
   means for varying at least one of said weighting factors to reduce said third video signals to below said predetermined values.

2. The apparatus of claim 1 wherein said means for varying includes means for determining the ratio of amplitudes of said first and second weighted difference signals for corresponding portions of said object and for setting said weighting factors in accordance with said ratio.

3. The apparatus of claim 1 wherein said first and second digital difference video signals represent successive differential images of said object.

4. In a method for producing video signals representing difference images from X-ray images of an object, an improvement for removing unwanted background images arising during a time differential between said X-ray images comprising the steps of:
   determining a set of weighting factors as a function of the difference between video signals caused by contrast media present commonly in successive difference images of said object; and
   performing a subtraction between said video signals of said successive different images weighted with said set of weighted factors.

* * * * *